US011599354B2

(12) United States Patent
Bhagwan et al.

(10) Patent No.: US 11,599,354 B2
(45) Date of Patent: Mar. 7, 2023

(54) DETECTING MISCONFIGURATION AND/OR BUG(S) IN LARGE SERVICE(S) USING CORRELATED CHANGE ANALYSIS

(71) Applicant: Microsoft Technology Licensing, LLC, Redmond, WA (US)

(72) Inventors: Ranjita Bhagwan, Bangalore (IN); Chandra Sekhar Maddila, Redmond, WA (US); Aditya Kumar, New Delhi (IN); Sumit Asthana, Allahabad (IN); Rahul Kumar, Bothell, WA (US); Sonu Mehta, Bangalore (IN); Chetan Bansal, Seattle, WA (US); Balasubramanyan Ashok, Bangalore (IN); Christian Alma Bird, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 16/515,135

(22) Filed: Jul. 18, 2019

(65) Prior Publication Data

US 2021/0019142 A1 Jan. 21, 2021

(51) Int. Cl.
*G06F 8/71* (2018.01)
*G06F 8/658* (2018.01)
(Continued)

(52) U.S. Cl.
CPC .............. *G06F 8/71* (2013.01); *G06F 8/427* (2013.01); *G06F 8/436* (2013.01); *G06F 8/658* (2018.02); *G06F 8/75* (2013.01); *G06N 20/00* (2019.01)

(58) Field of Classification Search
CPC ....... G06F 8/00–78; G06F 11/36–3696; G06F 8/427; G06F 8/436; G06F 8/658; G06F 8/71; G06F 8/75; G06N 20/00
See application file for complete search history.

(56) References Cited

U.S. PATENT DOCUMENTS

| | | | |
|---|---|---|---|
| 9,323,644 B1 * | 4/2016 | Hale | G06F 8/22 |
| 2010/0005134 A1 * | 1/2010 | Zamir | H04L 67/32 |
| | | | 709/203 |

(Continued)

OTHER PUBLICATIONS

Wang, Ye, Na Meng, and Hao Zhong. "An empirical study of multi-entity changes in real bug fixes." 2018 IEEE International Conference on Software Maintenance and Evolution (ICSME). IEEE, 2018. (Year: 2018).*

(Continued)

*Primary Examiner* — S. Sough
*Assistant Examiner* — Joanne G Macasiano
(74) *Attorney, Agent, or Firm* — Rainier Patents, P.S.

(57) ABSTRACT

Described herein is a system and method for detecting correlated changes (e.g., between code files and configuration files). For a plurality of code files and a plurality of configuration files, a correlated change model is trained to identify correlated changes across the code files and the configuration files using a machine learning algorithm that discovers change rules using a support parameter, and, a confidence parameter, and, a refinement algorithm that refines the discovered change rules. The correlated change model comprising the change rules is stored. The correlated change model can be used to identify potential issue(s) regarding a particular file (e.g., changed code or configuration file(s)). Information regarding the identified potential issue(s) can be provided to a user.

20 Claims, 7 Drawing Sheets

(51) Int. Cl.
    G06N 20/00    (2019.01)
    G06F 8/41     (2018.01)
    G06F 8/75     (2018.01)

(56)            References Cited

U.S. PATENT DOCUMENTS

| | | | | |
|---|---|---|---|---|
| 2011/0061040 | A1* | 3/2011 | Shaheen | G06F 8/20 |
| | | | | 717/100 |
| 2013/0080997 | A1* | 3/2013 | Dattathreya | G06F 8/71 |
| | | | | 717/121 |
| 2014/0007068 | A1* | 1/2014 | Cullen | G06F 16/11 |
| | | | | 717/169 |
| 2014/0053135 | A1 | 2/2014 | Bird et al. | |
| 2015/0293762 | A1* | 10/2015 | Abuelsaad | G06F 8/72 |
| | | | | 717/120 |
| 2018/0150742 | A1* | 5/2018 | Woulfe | G06N 20/00 |
| 2019/0087179 | A1* | 3/2019 | Velayudham | G06F 8/71 |
| 2019/0155722 | A1* | 5/2019 | Gupta | G06F 11/008 |
| 2020/0034135 | A1* | 1/2020 | Shi | G06N 5/04 |

OTHER PUBLICATIONS

Bevan, Jennifer, and E. James Whitehead Jr. "Identification of Software Instabilities." WCRE. vol. 3. 2003. (Year: 2003).*
Madeiral, Fernanda, et al. "Towards an automated approach for bug fix pattern detection." arXiv preprint arXiv:1807.11286 (2018). (Year: 2018).*
Dagit, Jason, and Matthew Sottile. "Identifying change patterns in software history." arXiv preprint arXiv: 1307.1719 (2013). (Year: 2013).*
"International Search Report and Written Opinion Issued in PCT Application No. PCT/US20/036717", dated Oct. 23, 2020, 14 Pages.
Wang, et al., "Predicting Co-changed Software Entities in the Context of Software Evolution", In Proceedings of the International Conference on Information Engineering and Computer Science, Dec. 19, 2009, 5 Pages.
"Association Rules and the Apriori Algorithm: A Tutorial", Retrieved from https://www.kdnuggets.com/2016/04/association-rules-apriori-algorithm-tutorial.html, Retrieved on: Apr. 24, 2019, 5 Pages.
"Generating Diffgrams of Xmlfiles", Retrieved from https://www.nuget.org/packages/XMLDiffPatch/, Retrieved on: Jun. 17, 2019, 3 Pages.
"GIT", Retrieved from https://git-scm.com/, Retrieved on: Jun. 17, 2019, 2 Pages.
"GitHub Inc.—Build for developers", Retrieved from https://github.com/, Retrieved on: Jun. 17, 2019, 7 Pages.
"Microsoft Azure Cloud Services", Retrieved from https://docs.microsoft.com/en-US/azure/cloud-services/cloud-services-choose-me, Apr. 19, 2017, 4 Pages.
"Microsoft Azure DevOps", Retrieved from https://azure.microsoft.com/en-in/services/devops/, Retrieved on: Jun. 17, 2019, 15 Pages.
"Microsoft Azure Documentation", Retrieved from https://docs.microsoft.com/en-in/azure/, Retrieved on: Jun. 17, 2019, 2 Pages.
"Roslyn: Code Syntax Analyzer", Retrieved from https://github.com/dotnet/roslyn, Retrieved on: Jun. 17, 2019, 3 Pages.
Weiss, et al., "Tortoise: Interactive System Configuration repair", In Proceedings of 32nd IEEE/ACM International Conference on Automated Software Engineering, Oct. 30, 2017, 12 Pages.
Agrawal, et al., "Fast Algorithms for Mining Association Rules", In Proceedings of the 20th International Conference of VLDB , vol. 1215, Sep. 12, 1994, pp. 487-499.
Barnett, et al., "Helping Developers Help themselves: Automatic Decomposition of Code Review Changesets", In Proceedings of the 37th International Conference on Software Engineering, vol. 1, May 16, 2015, pp. 134-144.

Bavota, et al., "An Empirical Study on the Developers' Perception of Software Coupling", In Proceedings of the 2013 International Conference on Software Engineering, May 18, 2013, pp. 692-701.
Bayardo, Roberto J., Jr., "Efficiently Mining long Patterns from Databases", In Proceedings of the 1998 International Conference on Management of Data, vol. 27, Issue 2, Jun. 1, 1998, pp. 85-93.
Bhagwan, et al., "Differential Bug Localization in Large-Scale Services", In 13th USENIX Symposium on Operating Systems Design and Implementation, Oct. 8, 2018, pp. 493-509.
Brin, et al., "Dynamic itemset Counting and Implication Rules for Market Basket Data", In Newsletter of ACM SIGMOD Record, vol. 26, Issue 2, Jun. 1997, pp. 255-264.
Han, et al., "Mining Frequent Patterns without Candidate Generation", In Newsletter of ACM SIGMOD Record, , vol. 29, Issue 2, Jun. 2000, 12 Pages.
Huang, et al., "Confvalley: A Systematic Configuration Validation Framework for Cloud Services", In Proceedings of the Tenth European Conference on Computer Systems, Article No. 19, Apr. 17, 2015, 16 Pages.
Huang, et al., "Eady Detection of Configuration Errors to Reduce Failure Damage", In Proceedings of the 12th USENIX Conference on Operating Systems Design and Implementation, Nov. 2, 2016, pp. 619-634.
Kutsia, et al., "Anti-Unification for Unranked Terms and Hedges", In Journal of Automated Reasoning, vol. 52, Issue 2, Apr. 13, 2013, pp. 155-190.
Robillard, Martin P., "Automatic Generation of Suggestions for Program Investigation", In Proceedings of the 10th European Software Engineering Conference held Jointly with 13th ACM SIGSOFT International Symposium on Foundations of Software Engineering, Sep. 5, 2005, pp. 11-20.
Scott, et al., "Getafix: Learning to Fix Bugs Automatically", In Journal of The Computing Research Repository, Feb. 2019, 19 Pages.
Sherman, Alex, "ACMS:The Akamai Configuration Management System", In Proceedings of the 2nd Conference an Symposium on Networked Systems Design & Implementation, vol. 2, May 2, 2005, pp. 245-258.
Silverman, B.W., "Using kernel Density Estimates to Investigate Multimodality", In Journal of the Royal Statistical Society vol. 43, Issue 1, Sep. 1981, pp. 97-99.
Tang, et al., "Holistic Configuration Management at Facebook", In Proceedings of the 25th Symposium on Operating Systems Principles, Oct. 4, 2015, pp. 328-343.
Wang, et al., "Automatic Misconfiguration Troubleshooting with PeerPressure", In Proceedings of the 6th conference on Symposium on Operating Systems Design & Implementation, vol. 06, Dec. 6, 2004, pp. 245-257.
Wang, et al., "Strider: A Black-box, State-based Approach to Change and Configuration Management and Support", In Journal of Science of Computer Programming, vol. 53, No. 2, Nov. 1, 2004, pp. 143-164.
Zhang, et al., "EnCore: Exploiting System Environment and Correlation Information for Misconfiguration Detection", In Proceedings of the 19th International Conference on Architectural Support for Programming Languages and Operating Systems, Mar. 1, 2014, pp. 687-700.
Xu, et al., "Hey, you have given me too many knobs: Understanding and Dealing with Over-Designed Configuration in System Software", In Proceedings of the 10th Joint Meeting on foundations of Software Engineering, Aug. 30, 2015, pp. 307-319.
Zimmerman, et al., "An Empirical Study on the Relation Between Dependency Neighborhoods and Failures", In Fourth IEEE International Conference on Software Testing, Verification and Validation, Mar. 21, 2011, 10 Pages.
Zimmerman, et al., "Mining Version Histories to Guide Software Changes", In Journal of IEEE Transactions on Software Engineering, vol. 31, Issue 6, Jun. 2005, pp. 1-10.

* cited by examiner

DETECTING MISCONFIGURATION AND/OR BUG(S) IN LARGE SERVICE(S) USING CORRELATED CHANGE ANALYSIS

BACKGROUND

Large services experience extremely frequent changes to code and/or configuration. In many cases, these changes are correlated across files. For example, a developer changes a code file to introduce a new feature in the service following which, the developer also changes a configuration file to enable the feature only on a small number of experimental machines. This example captures only one of numerous types of correlations that emerge organically in source-code and configurations of large services. Unfortunately, in almost all such cases, no documentation and/or specification guides engineers on how to make correlated changes and the engineers often miss these correlations. Such misses can be vastly disruptive to the service.

SUMMARY

Described herein is a rule-learning engine system, comprising: a computer comprising a processor and a memory having computer-executable instructions stored thereupon which, when executed by the processor, cause the computer to: for a plurality of code files and a plurality of configuration files, train a correlated change model to identify correlated changes across the code files and the configuration files using a machine learning algorithm that discovers change rules using a support parameter, and, a confidence parameter, and, a refinement algorithm that refines the discovered change rules; and, store the correlated change model comprising the change rules.

Also described herein is a method of detecting correlated changes, comprising: receiving information regarding a particular file; using a trained correlated change model comprising a plurality of change rules is to identify a potential issue regarding the particular file; and, providing information regarding the identified potential issue to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
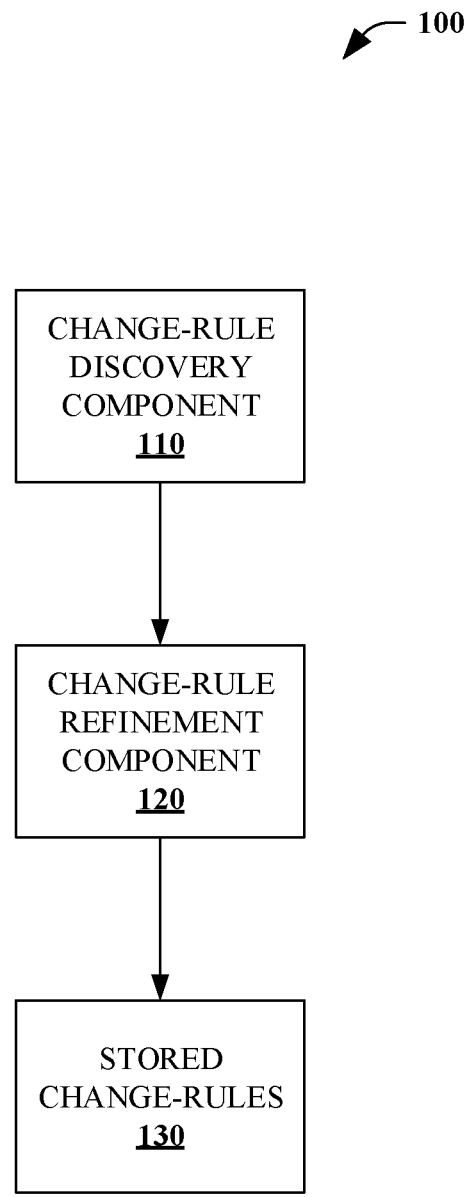
FIG. 1 is a functional block diagram that illustrates a rule-learning engine system.

Various technologies pertaining to detecting misconfiguration and/or bug(s) in large service(s) using correlated change analysis are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding detecting misconfiguration and/or bug(s) in large service(s) using correlated change analysis. What follows are one or more exemplary systems and methods.

Aspects of the subject disclosure pertain to the technical problem of detecting misconfiguration and/or bug(s) in large service(s) using correlated change analysis. The technical features associated with addressing this problem involve for a plurality of code files and a plurality of configuration files, a correlated change model is trained to identify correlated changes across the code files and the configuration files using a machine learning algorithm that discovers change rules using a support parameter, and, a confidence parameter, and, a refinement algorithm that refines the discovered change rules; storing the correlated change model. The correlated change model can be used to identify potential issue(s) regarding a particular file (e.g., changed code or configuration file(s)). Information regarding the identified potential issue(s) can be provided to a user. Accordingly, aspects of these technical features exhibit technical effects of more efficiently and effectively detecting misconfiguration and/or bug(s) in large service(s), for example, reducing computer resource consumption and/or increasing security of computer service(s).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Described herein is a system and method of using a combination of machine-learning and program analysis to learn change-rules that capture correlations across code and configuration files. When a user (e.g., an engineer) changes only a subset of files in a change-rule, the system can suggest additional change(s) to the user based on the change-rule. The system can positively affect submitted code and configuration changes in order to prevent or reduce code-quality degradation and/or service disruption.

The system and method are scalable providing a solution that scales to large repository(ies) and/or service(s). In some embodiments, the system and method provide techniques that work well across file-types, service-types, and/or, programming languages. In some embodiments, the system and method are effective in finding subtle misconfiguration(s) and/or bug(s) which existing tools cannot catch.

In some embodiments, the system and method can have one or more of the following characteristics: no manual inputs, post-compilation/pre-deployment, and/or, determination of correlation not causation.

In some embodiments, the system and method can be used to assist user(s) to find misconfiguration(s) and/or bug(s) early, while minimally intruding upon on the user's already busy schedule. In some embodiments, the system and method work with existing systems and logs, and do not require any additional logging or inputs from the user(s).

In some embodiments, the system and method can find correlations that existing tools such as compilers, IDEs, and/or, dependency-checkers cannot catch. Compilers or IDEs, for instance, capture correlations between function interface definitions and implementations: if a developer makes a change to one, the compiler or IDE will flag the other. The system and method can capture more subtle and/or diverse types of correlations across files and file-types which existing tools do not capture.

In some embodiments, the system and method can flag correlations, and does not detect causality because the cause of a specific set of correlated changes may not be captured by any logs.

For purposes of explanation and not limitation, as used herein "commit" refers to submission of update(s) and/or change(s) to file(s). "Commit-time" refers to a point in time where the updated and/or changed file(s) are submitted (e.g., committed and/or checked in) to a software version control system.

Referring to FIG. 1, a rule-learning engine system 100 is illustrated. The rule engine 100 includes a change-rule discovery component 110, a change-rule refinement component 120, and, a stored change-rules 130. The rule-learning engine system 100 utilizes association rule mining to determine correlations in code and configuration in order to enable correlated change analysis scale well and generalize to multiple file-types, repositories, and services.

Large-scale services run on a foundation of very large code-bases and configuration repositories. To run uninterrupted, a service not only depends on correct code, but also on rigorous testing, correct security configuration, and/or suitable deployment specification. This causes various dependencies both within and across such components which emerge organically. When an engineer changes a certain region of code or configuration, these dependencies require the engineer to make changes to other code and/or configuration regions. For instance, when a developer adds a new feature to a service, the developer may need to add a function to test the feature. Also, the developer may need to configure the service to deploy the new feature only to a small set of machines to test it further. Similarly, when an engineer renames a service API, the developer must also change firewall rule specification so that the rules apply to the now renamed API rather than to the old one.

Such changes occur extremely frequently and correlations such as these, that arise due to a variety of reasons, are most often left undocumented. Consequently, engineers, with no documentation or specification to go by, often miss making necessary code or configuration change(s). Such misses can delay deployment, increase security risks and, in some cases, even disrupt the service completely.

The rule-learning engine system 100 utilizes code files and configuration files as data in order to learn correlated changes and, when user(s) (e.g., developer(s)) miss making such changes, the learned correlated changes can be utilized to alert user(s) (e.g., developer(s)) before deployment of potentially erroneous code and/or configuration.

The rule-learning engine system 100 performs correlated component analysis over code files and configuration files. The rule-learning engine system 100 uses a combination of machine-learning and program analysis to do this. The change-rule discovery component 110 can utilize association rule mining on commit logs (e.g., month(s) or year(s)) to a particular software repository to determine change-rules that capture sets of files that often change together in the particular software repository. The change-rule refinement component 120 can then use differential syntax analysis to learn what types of changes are correlated, thereby making the change-rules more precise. These refined rules can be stored in a stored change-rules 130 which, when a user makes a commit, can be used to suggest additional change(s) that can prevent a bug and/or misconfiguration.

In some embodiments, the rule-learning engine system 100 can take advantage of three key observations with respect to services and repositories. First, correlations in code files and configuration files occur in a multitude of unpredictable ways. Consequently, the algorithm utilized by the rule-learning engine system 100 does not rely on any codification such as hard-coded domain-knowledge. Further, the algorithm does not depend on manual configuration and/or tuning.

Second, no two software repositories are alike. Repositories can have very distinct characteristics and, in some embodiments, the rule-learning engine system 100 performs repository-specific learning, with no extrapolation from one to the other. To make matters even more challenging, in some examples, even a single repository can change characteristics significantly over time. Hence, in some embodiments, the stored change-rules 130 can be periodically retrained so that suggestion(s) based on the model (e.g., stored change-rules 130) can be accurate.

Third, care has to be taken while applying association rule mining on large code and configuration files. Services depend upon a large amount of code files and configuration files. In some embodiments, applying rule mining which is exponential in the size of the input at the level of individual code and configuration constructs is simply not feasible. Thus, in some embodiments, the rule-learning engine system 100 performs rule-mining only at the file-level.

Association rule mining is fundamentally an exponential algorithm. Finding correlations between individual configuration parameters and code constructs such as variables and/or functions can be prohibitively expensive simply because of the sheer large numbers of such constructs. In order to properly scale, in some embodiments, the rule-learning engine system 100 mines change-rules at the file-level which makes the solution tractable and therefore scalable.

The rule-learning engine system 100 learns change-rules in two steps: change-rule discovery by the change-rule discovery component 110, and change-rule refinement by the change-rule refinement component 120. In the discovery step, association rule mining is used to find sets of files that change together "frequently". A set of parameters determine how frequently the files need to change for the change-rule discovery component 110 to learn the change-rule, as discussed below.

After change-rule discovery, the change-rule refinement component 120 performs change-rule refinement in order to make at least some of the change-rules, which are currently coarse-grained and at the file-level, more precise. The change-rule refinement component 120 can analyze the change in files of the change-rule to determine what types of changes are correlated, as discussed in greater detail below. The refined change-rules are stored in a stored change-rules 130 and used to make suggestion(s), for example, to developer(s) and/or engineer(s) based on the learnt rules (e.g., stored change-rules 130).

Figure 2:
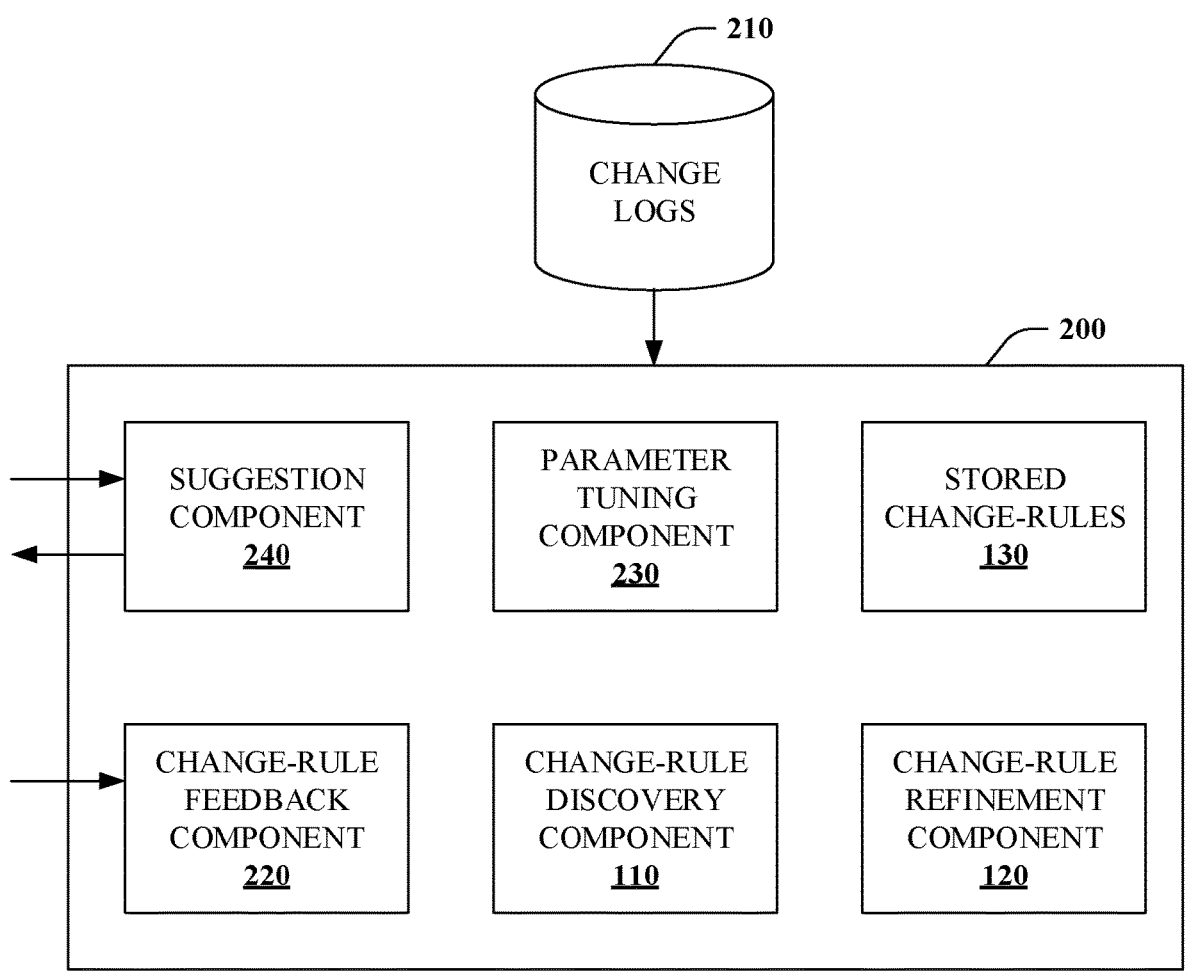
FIG. 2 is a functional block diagram that illustrates a correlated change suggestion system.

Turning to FIG. 2, a correlated change suggestion system 200 is illustrated. The system 200 includes the change-rule discovery component 110, the change-rule refinement component 120, and, the stored change-rules 130. The system 200 further includes stored change logs 210 that hold information regarding a plurality of commits, for example, which files changed, and how they changed. In some embodiments, periodically, the rule-learning engine system 100 runs both the change-rule discovery component 110 and the change-rule refinement component 120.

For example, when file(s) are committed (e.g., by an engineer/developer), the system 200 determines if change(s) to a correlated file may have been missed. If so, the system 200 suggests the additional file(s) to be changed to the developer.

A user (e.g., engineer and/or developer) either acts on the suggestion by editing the suggested file or does not. In some embodiments, a change-rule feedback component 220 uses this behavior as feedback to the training algorithm. Using this feedback, the system 200 can automatically tune parameter(s) used to learn the change-rules, as discussed below.

FIGS. 3-6 illustrate exemplary methodologies relating to detecting misconfiguration and/or bug(s) in large service(s) using correlated change analysis. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
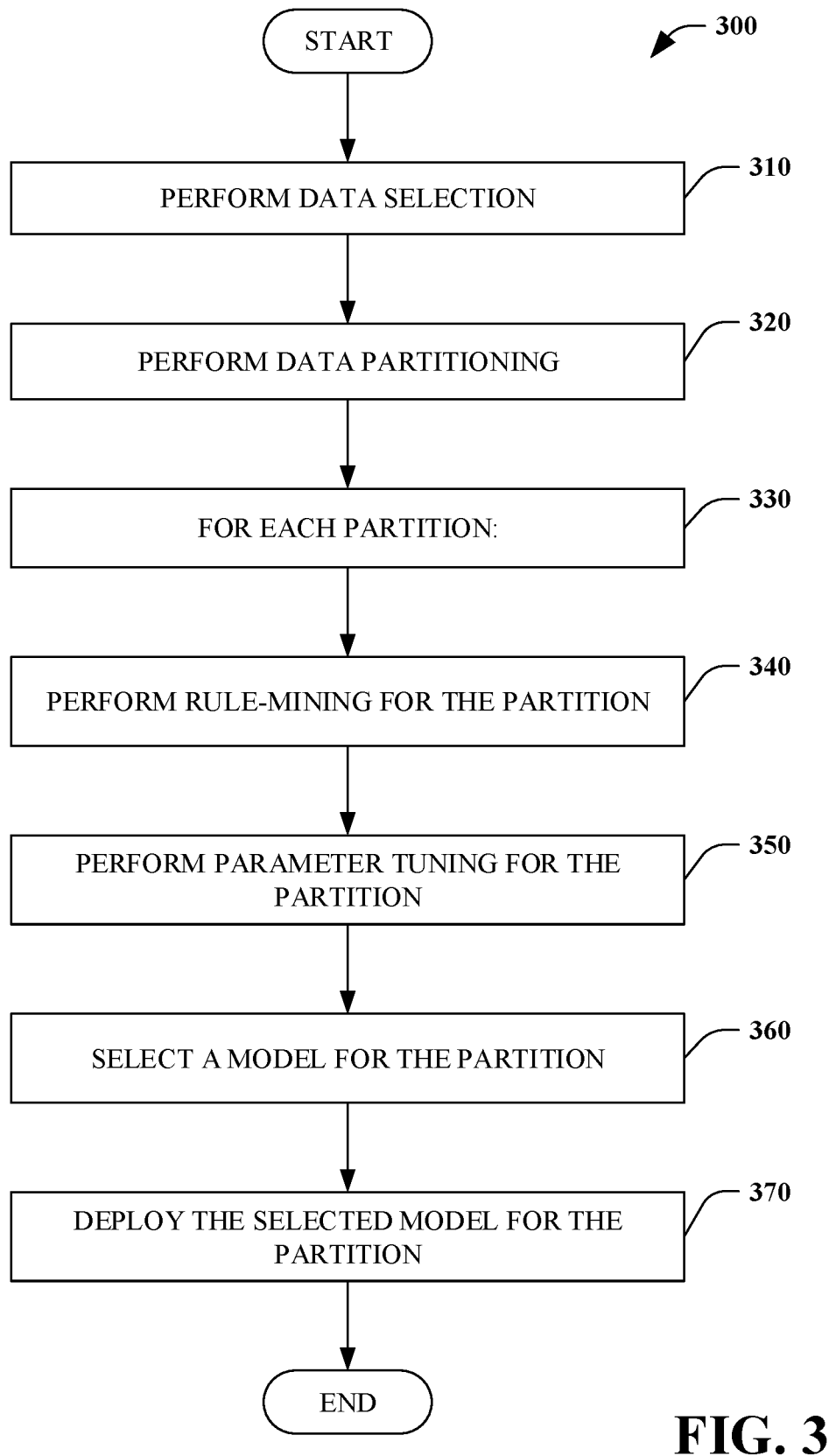
FIG. 3 is a flow chart that illustrates a method of change-rule discovery.

Referring to FIG. 3 with continued reference to FIG. 2, a method of change-rule discovery 300 is illustrated. In some embodiments, the method 300 is used by the rule-learning engine system 100, and, more specifically, by the change-rule discovery component 110, for association rule mining to discover change-rules.

At 310, data selection is performed. Commit data for a predetermined period of time (e.g., six month) can be selected for rule-mining, for example, stored in the change logs 210. In some embodiments, the change logs 210 can be pruned to exclude commit(s) that are aggregates of smaller commits caused by merging branches, and/or, porting a set of commits across branches. Since these commits put together a set of smaller commits that may not have any relation with each other, they do not capture true correlations between files. Moreover, such large commits can make mining rules prohibitively expensive. Examples of rules learned during change-rule discovery include: requiring a version number increment in a suggested file, nearly identical configuration files, and/or, code and configuration used by the code were added, so specification of how to flight the code is needed.

At 320, data partitioning is performed. In some embodiments, the change logs 210 are partitioned based upon a file edit-frequency distribution with rules learned on a separate model per data-partition. In some embodiments, this can be in addition to one model that learns rules across all files. The edit-frequency of a file can be defined as the number of times that changes to the file are made in a contiguous period (e.g., six months). In some embodiments, a domain-specific approach can be utilized with data partitioning for a particular repository being based on a particular file type.

At 330, for each partition, at 340, rule-mining is performed (e.g., for the particular data partition), for example, by the change-rule discovery component 110. A rule mining algorithm of the change-rule discovery component 110 can consider each commit as a transaction. First, the algorithm can discover frequent change-sets, for example, using the FP-Growth algorithm. A frequent change-set is a set of files that change together very often. Mathematically, a frequent change-set can be defined as $F=f_1, \ldots, f_n$ where files $f_1$ through $f_n$ have changed together at least $s_{min}$ times. $s_{min}$ is the minimum support defined for the model. The support of the frequent change-set, $s_F$, can be defined as the number of times files $f_1$ through $f_n$ change together. Hence, $s_F \geq s_{min}$.

Next, the algorithm can generate change-rules from the frequent change-sets. From the frequent change-set F, the rule $X \Rightarrow Y$ such that $X \subset F, Y \subset F, X \cap Y = \phi$ (e.g., there is no intersection of subset X with subset Y). The confidence of the rule is the number of times the files in F change together (support of file-set F) divided by the number of times all the files in X change together (support of file-set X). The rule's confidence is therefore $s_{X \cup Y}/s_X$. Hence, the more often files in sets X and Y change together, the higher the confidence of the rule $X \Rightarrow Y$. In some embodiments, the change-rule discovery component 110 learns a rule only if it has confidence above a minimum confidence $c_{min}$.

At 350, parameter tuning is performed, for example, by the parameter tuning component 230. In some embodiments, the change-rule discovery component 110 can use two parameters: the minimum support $s_{min}$ and the minimum confidence $c_{min}$. In some embodiments, using feedback on past suggestion(s), these parameters can be tuned to different values for each repository. In some embodiments, parameter tuning can be especially important because of one or more of the following reasons: variability across repositories, variability within a repository, and/or complexity of rule-mining.

Variability across repositories refers to repositories varying in size and frequency of commits. Given these varied characteristics across repositories, a rule-mining algorithm using one set of parameters may do well on one repository, but very badly on another.

Variability within a repository refers to a repository's characteristics changing with time. For example, in the planning or testing phase of a product, the repository may see far fewer commits than in the development phase.

Complexity of rule-mining refers to a rule mining algorithm tends to become prohibitively expensive if the minimum support $s_{min}$ is very low for a large input size.

In some embodiments, taking into account the three challenges, the system 200 can tune multiple models and their value of $s_{min}$ for each repository. In some embodiments, $c_{min}$ can be set to a constant (e.g., a relatively low value of 0.5 which is not altered). This is because while is desired to for change-rule discovery to learn a relatively large set of rules, perhaps some with low confidence, change-rule refinement is performed to make the rules more precise, as discussed below.

An exemplary tuning algorithm can be described as follows. For a mean edit-frequency for a specific data partition of μ, and a standard deviation of σ, various models for a particular partition can be trained by setting $s_{min}$ in the range μ±σ. A predefined minimum threshold (e.g., of 4) can be utilized to reduce consumption of computation resources. A model can be built by setting $s_{min}$ to the predefined minimum threshold, which is the lower-bound on minimum support. This model can be referred to as the baseline model because this effectively learns the largest set of change-rules computationally allowed.

Each model can be evaluated on data and the best one selected in the following way. In some embodiments, the model can be applied after every commit in a pull-request. If the model makes a suggestion, and if the user had indeed changed the suggested files in a later commit to the same pull-request, the suggestion is a true-positive. Otherwise, the suggestion is a false-positive. In addition, false-negatives can be computed. This is the number of true-positives that the baseline model with $s_{min}$ set to 4 found, but the current model did not. In this manner, each model's false-negatives can be computed relative to the baseline model.

At 360, a model is selected (e.g., as the correlated change model for the partition). For example, from these number, precision, recall and/or F1-score can be computed for each model. Finally, the model with the highest F1-score can be selected. At 370, the selected model can be deployed (e.g., 340, 350, 360 can be performed for each partition). In some embodiments, the method 300 can be performed periodically (e.g., every day) for a particular repository.

Once the change-rules have been initially discovered, the change-rule refinement component 120 can refine the change-rules, for example, to reduce false-positive(s). Given a change-rule X⇒Y, the change-rule refinement component 120 can determine what types of change(s) in X led to change(s) in Y. In some embodiments, X comprises code files while Y comprises configuration files. In some embodiments, X comprises configuration files while Y comprises code files. In some embodiments, X comprises code files and configuration files while Y comprises other code files and other configuration files.

For purposes of illustration and not limitation, the two examples are discussed. In a first example, when a developer adds a new method to a core code file, the developer may add code to test the new method in a different test file. However, if the developer is only changing the body of an existing method, the method already has a corresponding test, and the developer does not need to change the test file.

In a second example, when an engineer adds some commands that configure certain hardware in the datacenter, the engineer needs to update the same information in another similar configuration file in another datacenter. Any other additions to the configuration need not be replicated to the other datacenter.

In some embodiments, using differential syntax analysis, the change-rule refinement component 120 can learn these pattern(s) for code and/or configuration files to generate a feature-set that captures the type of changes.

Figure 4:
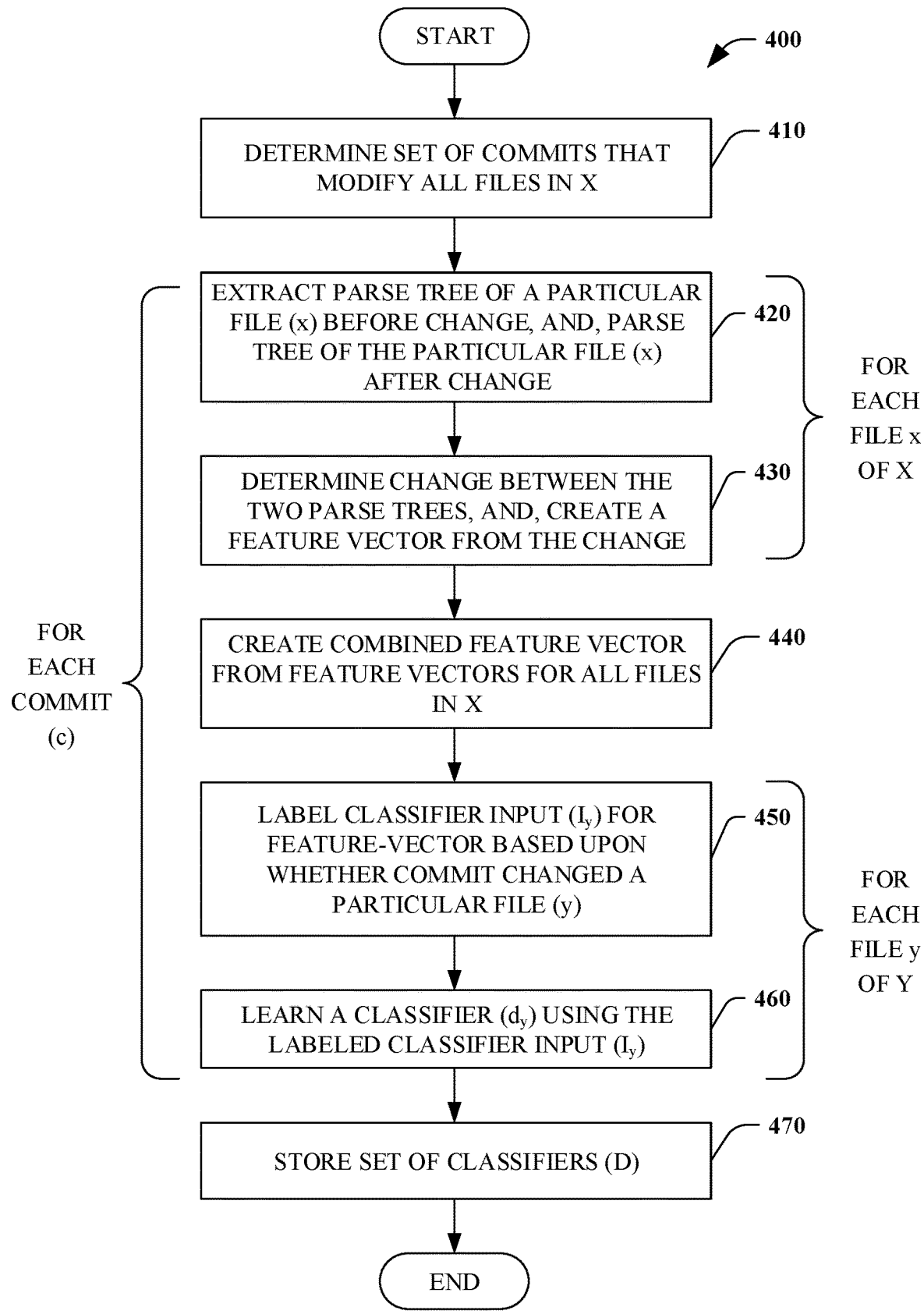
FIG. 4 is a flow chart that illustrates a method of change-rule refinement.

Turning to FIG. 4 with continued reference to FIG. 2, a method of change-rule refinement 400 (e.g., change-rule refinement algorithm) is illustrated. In some embodiments, the method 400 is used by the change-rule refinement component 120.

At 410, a set of commits that modify all files x in X is determined. That is, for each rule r:X⇒Y, a set of commits C that modify every file in X is created. The commits in this set C may or may not modify files in set Y.

At 420, for every file x in X, a parse tree for the file before the change is extracted, and, a parse tree for the file after the change is extracted. For example, for every commit in C, every file in X can be run through a parse tree extractor. The parse tree extractor creates two parse trees for the file: one before the change and the other after the change.

At 430, for each file x in X, changes are determined between the parse tree for the file before the change, and, the parse tree for the file after the change. A feature vector is generated based upon the determined changes between the two parse trees. The feature vector characterizes the nature of the change to the file.

Table 1 lists an exemplary set of features used for code files:

TABLE 1

| MethodsAdded, | IfConditionsAdded, | ClassesAdded, |
|---|---|---|
| MethodsRemoved, | IfConditionsRemoved | ClassesRemoved, |
| Methods Changed | | |
| ForStatementsAdded, | UsingsAdded, | LinesOfCodeAdded, |
| ForStatementsRemoved | UsingsRemoved | LinesOfCodeRemoved |

Most features in Table 1 are categorical, such as whether a method is added, changed, or removed. In some embodiments, additional features can be numerical, such as lines of code added or removed.

At 440, a combined feature vector is created from the feature vectors for all files x in X.

At 450, for each file y∈Y, a tuple containing this feature-vector and a label is created. In some embodiments, the label is "changed" or "unchanged" depending on whether this commit changed file y. In some embodiments, this process can be run for every commit at the end of which, a set of labelled data has been generated for each file y in rule r.

At 460, for each file y of Y, using this data, a classifier $d_y$ (e.g., decision-tree based classifier) can be built that captures what types of changes in X lead to changes in file y. At 470, a change-rule r has an added component $D_r$, where $D_r$ is a set of all classifiers for files y∈Y. For example, the change-rule r can be stored in the stored change-rules 130.

In some embodiments, determining the correct features for files in X can be a significant factor. This set fundamentally differs depending on whether the file being processed is a code file, or a configuration file. While code files are characterized by features, for example, as described in Table 1, configuration files can pose a more significant challenge since they do not have the rigid structure that code files generally possess.

Thus, in some embodiments, a pre-defined feature-set such as for code files cannot be used for configuration files.

For every configuration file, the system 100 has to learn a separate feature-set that is specific to this file.

In some embodiments, a feature-learning approach is utilized for this purpose which uses the process of anti-unification. An anti-unification algorithm can learn a set of regular expressions across additions, modifications and deletions to file x which are common. Anti-unification tries to find the least general generalization that can describe/learn recurring edit patterns. The system 200 can then use these as features to learn the classifier.

Referring back to FIG. 2, the system 200 further includes a suggestion component 240. For example, when a user (e.g., developer/engineer) submits (e.g., changes, updates, and/or commits) a code or configuration change to a repository, the suggestion component 240 can intercept the submission and determine a set of change-rules that match the submission (e.g., change, update, and/or commit).

For each change-rule X⇒Y, the system 200 determines if X is a subset of the files changed in the commit. The system 200 then passes the changes through the parse tree extractor and classifier to determine if the system should suggest changing file y or not. If the classifier predicts change in file y, the system 200 generates a suggestion. In some embodiments, the system 200 does not make recommendations for pull-request updates where there are merge commits so as to reduce noise.

In some embodiments, there can be multiple suggestions for each change, update, and/or commit. In some embodiments, the suggestion component 240 can order them using a metric called lift, also called the "interestingness" measure that takes into account the prior probability of y. This metric can help to measure how likely the change in y is, when X is changed, while controlling for how frequently edited y is.

The change-rule feedback component 220 can monitor if the user acts on any of the suggestions, and stores information about true-positive and false-positive suggestion(s). The parameter tuning component 230, in turn, can use this feedback, as discussed above.

The system 200 can detect change correlations. Correlations can occur due to various reasons. For purposes of explanation and not limitation, these correlations can occur because of versioning, fighting, testing, replicating code and configuration, complex configuration, scripting, and/or miscellaneous causes.

With respect to versioning, when a user (e.g., an engineer) updates and/or adds code to a library, the user also needs to increment the version number of the library. This creates correlations between code files and files that contain version information. Version numbers are stored in different types of files and in different formats (e.g., csproj files, xml files, and/or j son files), depending on the code-base. If a user misses incrementing a version number, the user could seriously disrupt the service. For example, a new library may not be backward-compatible with an older library. Hence, if it uses the same version number as the previous one, another component that depends on the older version could fail. In some embodiments, the system 200 can determine such correlations irrespective of the file-type and format.

"Flighting" occurs when a user adds a new feature which is deployed in stages. For example, the user may first deploy the new feature to a small subset of machines to ensure that the feature works as planned and does not cause disruptions. Once this has been ensured, the user may deploy the feature more widely. Hence, when the user adds code to implement a new feature, the user also needs to add configuration to files that define the set of machines that will test this feature.

Testing is a fairly common reason for file correlations. For example, when a user adds a new feature to code, the user may should consider adding a new test for that feature in a separate file that contains only tests. While this is fairly common across multiple code-bases and services, each code-base has its own organization structure for separating test code from the main production code. The system 200 can automatically detect such structures without having the structure specified manually.

Often, users replicate files and file contents across different logical boundaries of the service. This is done since, without replication, there will be a larger number of dependencies across files and components. This in turn will lead to less modular code-bases which may take longer to test, debug, and deploy. For example, a configuration file can be replicated across different alerting frameworks. If a user changes one, without knowing that a replica existed within the other alerting framework, the system 200 can detect and provide suggestion(s) to correct the issue.

Configuring services is a complex task and, as a result, in some embodiments, several correlations show up between configuration files. For example, the system 200 can detect an instance where a user renamed a microservice but forgot to change the name of the service in the file that contained its firewall rules. This can cause a security issue. In another example, for an instance where hardware configuration files are correlated, the system 200 can detect a missing a change can cause a service disruption.

Often, administrators use scripts to test and deploy services. These scripts can have complex inter-dependencies which, unlike compiled code, can go unchecked at submission-time (e.g., change-time, update-time, and/or commit-time). For example, a user can change a function definition in one script and hence the user is required to change the way the function was called in another script. The system 200 can detect a failure to change the way the function was called, while existing IDEs and compilers generally do not.

For purposes of explanation and not limitation, examples involving only two files have been discussed. However, in some embodiments, change-rules can contain more than two files.

Figure 5:
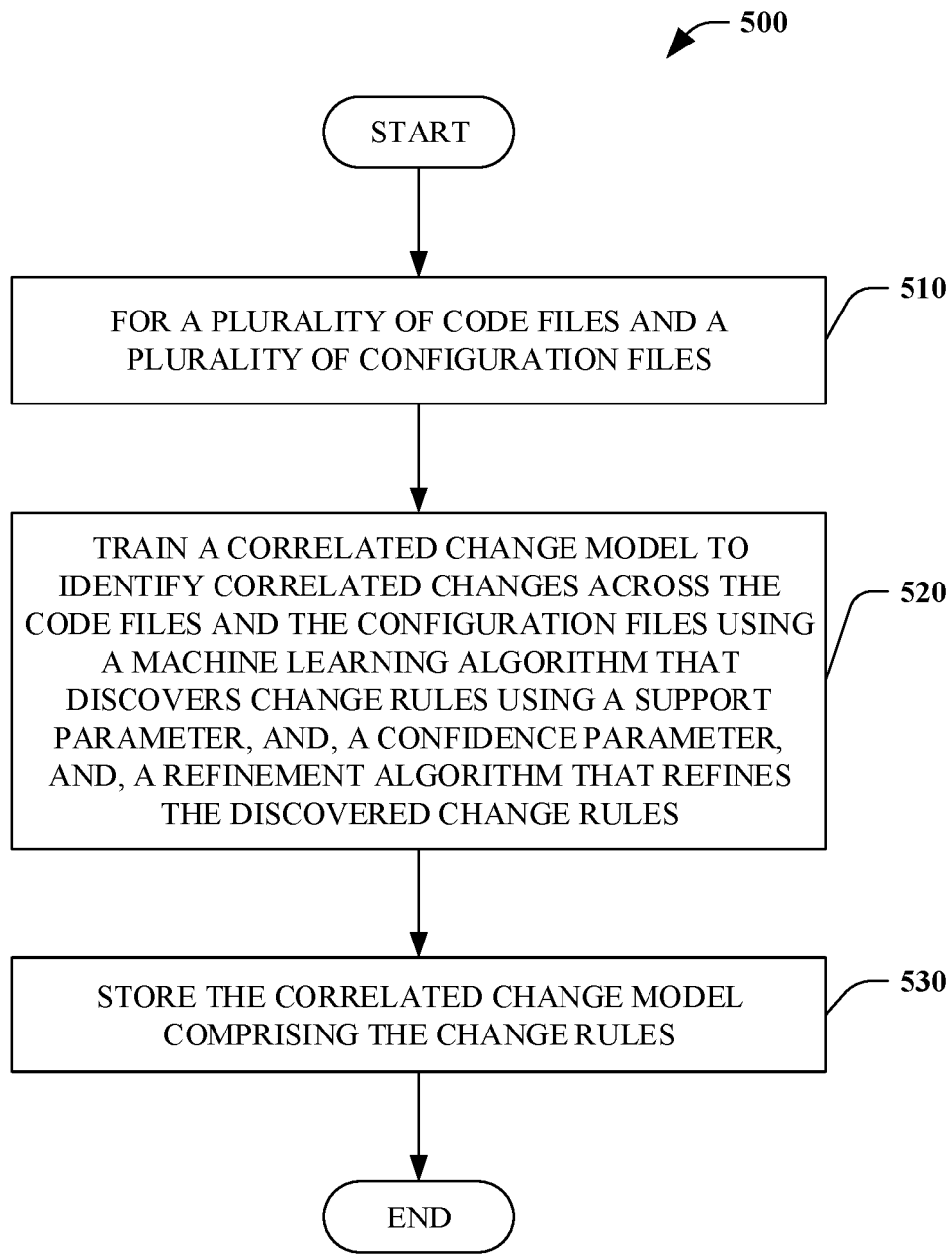
FIG. 5 is a flow chart that illustrates a method of training a correlated change analysis model.

Referring to FIG. 5, a method of training a correlated change analysis model 500 is illustrated. In some embodiments, the method 500 is performed by the rule engine 100.

At 510, for a plurality of code files and a plurality of configuration files (e.g., based on change logs, update logs, and/or commit logs), at 520, a correlated change model is trained to identify correlated changes between the code files and the configuration files using a machine learning algorithm that discovers change rules using a support parameter, and, a confidence parameter, and, a refinement algorithm that refines the discovered change rules. At 530, the correlated change model comprising the change rules is stored.

Figure 6:
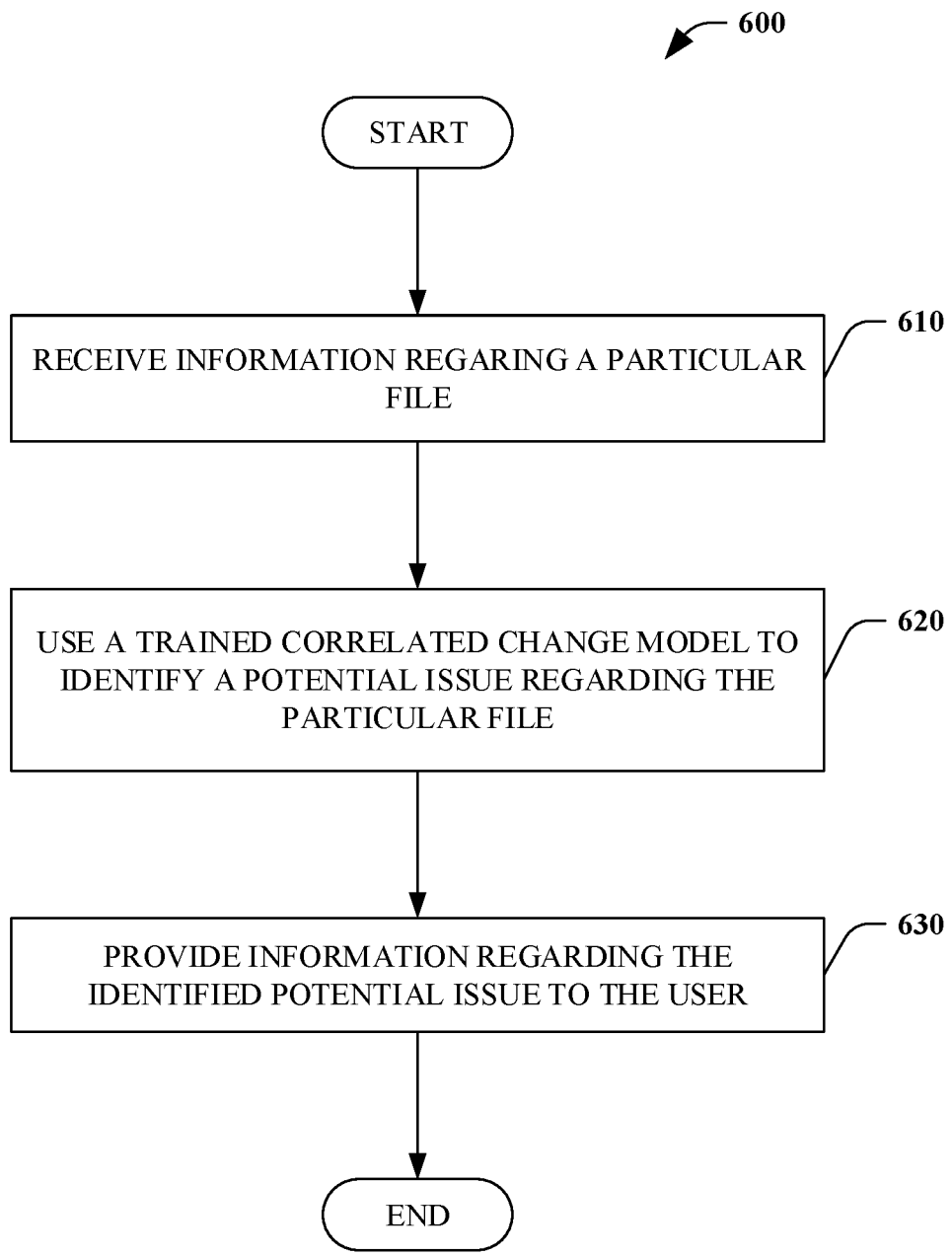
FIG. 6 is a flow chart that illustrates a method of detecting correlated changes.

Turning to FIG. 6, a method of detecting correlated changes 600 is illustrated. In some embodiments, the method 600 is performed by the system 200.

At 610, information regarding a particular file is received. At 620, a trained correlated change model comprising a plurality of change rules is used to identify a potential issue regarding the particular file. At 630, information regarding the identified potential issues is provided to a user.

Described herein is a rule-learning engine system, comprising: a computer comprising a processor and a memory having computer-executable instructions stored thereupon which, when executed by the processor, cause the computer to: for a plurality of code files and a plurality of configuration files, train a correlated change model to identify correlated changes across the code files and the configuration files using a machine learning algorithm that discovers change rules using a support parameter, and, a confidence parameter, and, a refinement algorithm that refines the discovered change rules; and store the correlated change model comprising the change rules.

The system can further include wherein the refinement algorithm utilizes a differential syntax analysis utilizing a parse tree for a particular file before a change and a parse tree for the particular file after the change for each of a plurality of files. The system can include the memory having further computer-executable instructions stored thereupon which, when executed by the processor, cause the computer to: for each of the plurality of files: determine changes between the parse tree for the particular file before the change and the parse tree for the particular file after the change; and create a feature vector characterizing the determined changes.

The system can include the memory having further computer-executable instructions stored thereupon which, when executed by the processor, cause the computer to: train classifiers in accordance with the created feature vectors for each of the plurality of files, wherein the correlated change model comprises the trained classifiers. The system can further include wherein training the correlated change model to identify correlated changes between the code files and the configuration files further comprises: partition data into a plurality of partitions based upon similar edit-frequency; for each particular partition of the plurality of partitions, train a plurality of models: perform rule-mining for the particular partition; perform parameter tuning of at least one of the support parameter or the confidence parameter, for the particular partition; and, select a model as the correlated change model for the particular partition, wherein the correlated change model comprises the correlated change models for the plurality of partitions.

Described herein is a method of detecting correlated changes, comprising: receiving information regarding a particular file; using a trained correlated change model comprising a plurality of change rules to identify a potential issue regarding the particular file; and providing information regarding the identified potential issue to a user.

The method can further include receiving information regarding a user action in response to the provided information; and updating the trained correlated change model in accordance with the receiving information regarding the user action, the particular file, and, the provided information regarding the identified potential issue. The method can further include: for a plurality of code files and a plurality of configuration files, training the correlated change model to identify correlated changes across the code files and the configuration files using a machine learning algorithm that discovers change rules using a support parameter, and, a confidence parameter, and, a refinement algorithm that refines the discovered change rules; and storing the correlated change model comprising the change rules.

The method can further include wherein the refinement algorithm utilizes a differential syntax analysis. The method can further include wherein training the correlated change model to identify correlated changes between the code files and the configuration files further comprises: partition data into a plurality of partitions based upon similar edit-frequency; for each particular partition of the plurality of partitions, train a plurality of models: perform rule-mining for the particular partition; perform parameter tuning of at least one of the support parameter or the confidence parameter, for the particular partition; and, select a model as the correlated change model for the particular partition, wherein the correlated change model comprises the correlated change models for the plurality of partitions.

The method can further include wherein the information regarding the particular file is received when the user commits at least one of a code file or a configuration file to a repository. The method can further include wherein using the trained correlated change model comprises: extracting a parse tree for the particular file and using a classifier to identify the potential issue regarding the particular file.

Described herein is a computer storage media storing computer-readable instructions that when executed cause a computing device to: receive information regarding a particular file; use a trained correlated change model comprising a plurality of change rules is to identify a potential issue regarding the particular file; and provide information regarding the identified potential issue to a user.

The computer storage media can store further computer-readable instructions that when executed cause a computing device to: receive information regarding a user action in response to the provided information; and update the trained correlated change model in accordance with the receiving information regarding the user action, the particular file, and, the provided information regarding the identified potential issue.

The computer storage media can store further computer-readable instructions that when executed cause a computing device to: for a plurality of code files and a plurality of configuration files, train the correlated change model to identify correlated changes across the code files and the configuration files using a machine learning algorithm that discovers change rules using a support parameter, and, a confidence parameter, and, a refinement algorithm that refines the discovered change rules; and store the correlated change model comprising the change rules.

The computer storage media can further include wherein the refinement algorithm utilizes a differential syntax analysis utilizing a parse tree for a particular file before a change and a parse tree for the particular file after the change for each of a plurality of files. The computer storage media can further include wherein training the correlated change model to identify correlated changes between the code files and the configuration files further comprises: partition data into a plurality of partitions based upon similar edit-frequency; for each particular partition of the plurality of partitions, train a plurality of models: perform rule-mining for the particular partition; perform parameter tuning of at least one of the support parameter or the confidence parameter, for the particular partition; and, select a model as the correlated change model for the particular partition, wherein the correlated change model comprises the correlated change models for the plurality of partitions.

The computer storage media can further include wherein the information regarding the particular file is received when the user commits at least one of a code file or a configuration file to a repository. The computer storage media can further include wherein using the trained correlated change model comprises: extracting a parse tree for the particular file and using a classifier to identify the potential issue regarding the particular file. The computer storage media can further include wherein the information provided to the user regarding the identified potential issues related to a security issue associated with the particular file.

Figure 7:
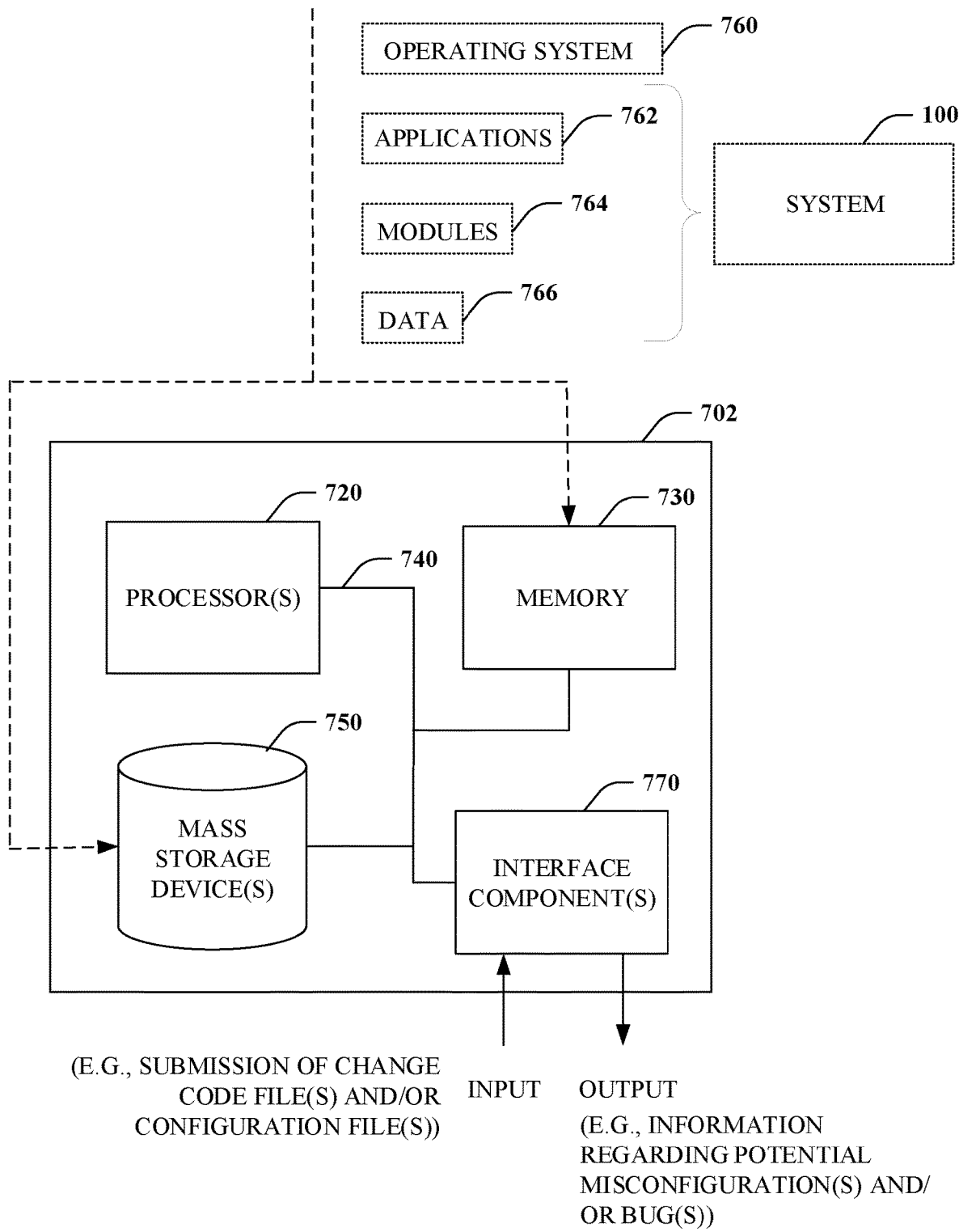
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, settop box, game system, compute node, etc.). For instance, the computing device 702 may be used the rule-learning engine system and/or the correlated change suggestion system 200.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, rule-learning engine system 100 or portions thereof, can be, or form part, of an application 762, and include one or more modules 764 and data 766 stored in memory and/or mass storage device(s) 750 whose functionality can be realized when executed by one or more processor(s) 720.

In some embodiments, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the rule-learning engine system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a processor; and
   a memory having computer-executable instructions stored thereupon which, when executed by the processor, cause the system to:
   for a plurality of code files and a plurality of configuration files that control runtime execution of one or more features in the plurality of code files, train a correlated change model to identify correlated changes across the plurality of code files and the plurality of configuration files using a machine learning algorithm and a refinement algorithm, wherein the machine learning algorithm discovers change rules using a support parameter and a confidence parameter and the refinement algorithm refines the change rules discovered by the machine learning algorithm, and each change rule identifies a set of two or more files that tend to be changed together; and
   store the correlated change model comprising the change rules, the correlated change model being configured to use a particular change rule to detect when a particular configuration file is missing a particular change to enable a particular feature in a particular code file.

2. The system of claim 1, the memory having further computer-executable instructions stored thereupon which, when executed by the processor, cause the system to:
   for each individual code file of the plurality of code files, apply the refinement algorithm to perform a differential syntax analysis utilizing a first parse tree for the individual code file before a respective change to the individual code file and a second parse tree for the individual code file after the respective change to the individual code file.

3. The system of claim 2, the memory having further computer-executable instructions stored thereupon which, when executed by the processor, cause the system to:
   create feature vectors characterizing differences between the first parse tree and the second parse tree for each individual code file.

4. The system of claim 3, the memory having further computer-executable instructions stored thereupon which, when executed by the processor, cause the system to:
   train classifiers in accordance with the feature vectors, wherein the correlated change model comprises the trained classifiers.

5. The system of claim 1, wherein the particular configuration file identifies one or more machines on which the particular feature is enabled.

6. A method, comprising:
   receiving information regarding a change to a particular code file;
   inputting the information regarding the change to the particular code file to a machine-trained correlated change model comprising a plurality of change rules that identify sets of two or more files that tend to be changed together;
   receiving, from the machine-trained correlated change model, identification of a particular configuration file that tends to be changed together with the particular code file, wherein the machine-trained correlated change model identifies the particular configuration file based at least on a particular change rule identifying the particular configuration file as having a tendency to be changed with the particular code file;
   determining that a corresponding change to the particular configuration file is missing; and
   providing a suggestion to make the corresponding change to the particular configuration file.

7. The method of claim 6, further comprising:
   receiving information regarding a user action in response to the suggestion; and
   updating the machine-trained correlated change model in accordance with the information regarding the user action, the particular code file, and, the suggestion.

8. The method of claim 6, further comprising:
   for a plurality of code files and a plurality of configuration files, training the machine-trained correlated change model to identify correlated changes across the plurality of code files and the plurality of configuration files using a machine learning algorithm and a refinement algorithm, wherein the machine learning algorithm discovers the plurality of change rules using a support parameter and a confidence parameter and the refinement algorithm refines individual change rules discovered using the machine learning algorithm; and
   storing the machine-trained correlated change model comprising the change rules refined by the refinement algorithm.

9. The method of claim 8, wherein the refinement algorithm utilizes differential syntax analysis.

10. The method of claim 8, wherein training the machine-trained correlated change model further comprises:
    partitioning data into a plurality of partitions based upon similar edit-frequency;
    for each particular partition of the plurality of partitions:
      training a plurality of machine-trained models;
      performing rule-mining;
      performing parameter tuning of at least one of the support parameter or the confidence parameter; and
      selecting a specific model from the plurality of machine-trained models for the particular partition.

11. The method of claim 6, wherein the information regarding the change to the particular code file is received responsive to the particular code file being committed to a repository.

12. The method of claim 6, further comprising:
extracting a parse tree for the particular code file and using a classifier of the machine-trained correlated change model to identify the suggestion based at least on the parse tree.

13. A computer storage media storing computer-readable instructions that, when executed, cause a computing device to:
receive information regarding a change to a particular code file;
provide the information regarding the change to the particular code file to a machine-trained correlated change model comprising a plurality of change rules that identify sets of two or more files that tend to be changed together;
receive, from the machine-trained correlated change model, identification of a particular configuration file that tends to be changed together with the particular code file, wherein the machine-trained correlated change model identifies the particular configuration file based at least on a particular change rule identifying the particular configuration file as having a tendency to be changed with the particular code file;
determine that a particular change to the particular configuration file to enable a particular feature in the particular code file is missing; and
output a suggestion to make the particular change to the particular configuration file to enable runtime execution of the particular feature in the particular code file.

14. The computer storage media of claim 13 storing further computer-readable instructions that, when executed, cause the computing device to:
receive information regarding a user action in response to the suggestion; and
update the machine-trained correlated change model in accordance with the information regarding the user action, the particular configuration file, and the suggestion.

15. The computer storage media of claim 13 storing further computer-readable instructions that, when executed, cause the computing device to:
for a plurality of code files and a plurality of configuration files, train the machine-trained correlated change model to identify correlated changes across the plurality of code files and the plurality of configuration files using a machine learning algorithm and a refinement algorithm, wherein the machine learning algorithm discovers the plurality of change rules using a support parameter and a confidence parameter and the refinement algorithm refines individual change rules; and
store the machine-trained correlated change model comprising the plurality of change rules.

16. The computer storage media of claim 15, wherein the refinement algorithm performs a differential syntax analysis utilizing parse trees reflecting changes to individual code files.

17. The computer storage media of claim 15, wherein training the machine-trained correlated change model further comprises:
partitioning data into a plurality of partitions based upon similar edit-frequency;
for each particular partition of the plurality of partitions:
training a plurality of models;
performing rule-mining;
performing parameter tuning of at least one of the support parameter or the confidence parameter; and
selecting a specific model from the plurality of models for the particular partition.

18. The computer storage media of claim 13, wherein the information regarding the change to the particular code file is received when the particular code file is committed to a repository.

19. The computer storage media of claim 13, storing further computer-readable instructions that, when executed, cause the computing device to:
extract a parse tree for the particular code file or the particular configuration file and use a classifier of the machine-trained correlated change model to identify the suggestion based at least on the parse tree.

20. The computer storage media of claim 13, wherein the suggestion relates to a security issue associated with the particular code file.

* * * * *